US011709830B2

United States Patent
Chen et al.

(10) Patent No.: US 11,709,830 B2
(45) Date of Patent: *Jul. 25, 2023

(54) SYSTEMS AND METHODS FOR MANAGING A HIGHLY AVAILABLE DISTRIBUTED HYBRID TRANSACTIONAL AND ANALYTICAL DATABASE

(71) Applicant: Coupang Corp., Seoul (KR)

(72) Inventors: Zhan Chen, Seattle, WA (US); Bin Dong, Beijing (CN); Zhiyong Huang, Beijing (CN); Chuanchuan Han, Beijing (CN); Junzhao Zhang, Beijing (CN)

(73) Assignee: Coupang Corp., Seoul (KR)

( * ) Notice: Subject to any disclaimer, the term of this patent is extended or adjusted under 35 U.S.C. 154(b) by 148 days.

This patent is subject to a terminal disclaimer.

(21) Appl. No.: 17/240,219

(22) Filed: Apr. 26, 2021

(65) Prior Publication Data
US 2022/0164351 A1 May 26, 2022

Related U.S. Application Data

(63) Continuation of application No. 17/105,040, filed on Nov. 25, 2020, now Pat. No. 11,016,969.

(51) Int. Cl.
*G06F 16/245* (2019.01)
*G06F 16/25* (2019.01)
(Continued)

(52) U.S. Cl.
CPC .... *G06F 16/24528* (2019.01); *G06F 11/2025* (2013.01); *G06F 11/3428* (2013.01);
(Continued)

(58) Field of Classification Search
None
See application file for complete search history.

(56) References Cited

U.S. PATENT DOCUMENTS 7,945,575 B2 * 5/2011 Cushing .............. G06F 16/2423
707/765
8,170,981 B1 * 5/2012 Tewksbary .............. G06F 16/25
707/600
(Continued)

FOREIGN PATENT DOCUMENTS

CN 102906743 A 1/2013
CN 103198159 A 7/2013
(Continued)

OTHER PUBLICATIONS

International Search Report and Written Opinion for counterpart application No. PCT/IB2020/061459 dated Aug. 12, 2021 (9 pages).
(Continued)

*Primary Examiner* — Son T Hoang
(74) *Attorney, Agent, or Firm* — Finnegan, Henderson, Farabow, Garrett & Dunner LLP

(57) ABSTRACT

Systems and methods for managing a highly available distributed hybrid database comprising: a memory storing instructions; and one or more processors configured to execute the instructions to: receive a query from a user device to retrieve data from a distributed database comprising a source node, a first plurality of replica nodes, and a second plurality of replica nodes, wherein the source node and the first plurality of replica nodes form a transactional cluster, and wherein the second plurality of replica nodes forms an analytical cluster; determine whether to process the query using the transactional cluster or the analytical cluster based on one or more rules; translate the query into a first protocol that the determined cluster comprehends; select a replica node corresponding to the determined cluster; process the query using the selected replica node; and send data associated with results from processing the query to the user device.

18 Claims, 9 Drawing Sheets

(51) Int. Cl.
  *G06F 16/28*     (2019.01)
  *G06F 16/27*     (2019.01)
  *G06F 16/2452*   (2019.01)
  *G06F 16/2455*   (2019.01)
  *G06F 16/2453*   (2019.01)
  *G06F 11/34*     (2006.01)
  *G06F 11/20*     (2006.01)

(52) U.S. Cl.
  CPC .. *G06F 16/24549* (2019.01); *G06F 16/24564* (2019.01); *G06F 16/258* (2019.01); *G06F 16/27* (2019.01); *G06F 16/285* (2019.01)

(56) References Cited

U.S. PATENT DOCUMENTS

| | | | |
|---|---|---|---|
| 9,501,550 B2 | 11/2016 | Zhang et al. | |
| 2007/0050328 A1 | 3/2007 | Li et al. | |
| 2010/0005124 A1 | 1/2010 | Wagner | |
| 2012/0197868 A1* | 8/2012 | Fauser | G06F 16/183 707/E17.054 |
| 2014/0279839 A1 | 9/2014 | Balzar et al. | |
| 2018/0121532 A1* | 5/2018 | Liu | G06F 16/25 |
| 2018/0322157 A1* | 11/2018 | Lee | G06F 16/2471 |
| 2020/0042712 A1* | 2/2020 | Foo | G06F 16/9024 |
| 2020/0175034 A1* | 6/2020 | Bourbonnais | G06F 16/24568 |
| 2020/0210398 A1 | 7/2020 | Liu et al. | |
| 2020/0320051 A1 | 10/2020 | Lee et al. | |

FOREIGN PATENT DOCUMENTS

| | | |
|---|---|---|
| CN | 109327539 A | 2/2019 |
| CN | 109918229 A | 6/2019 |
| TW | I433039 B | 4/2014 |
| TW | I503679 B | 10/2015 |

OTHER PUBLICATIONS

Examination Notice in counterpart Hong Kong Patent Application No. 22021032439.2 dated Jun. 20, 2022 (3 pages).
Notice of Preliminary Rejection in counterpart Korean Paten Application No. 10-2021-7020146 dated Aug. 9, 2022 (11 pages).
Notice of Allowance in counterpart Taiwanese Application No. 110116842 dated Nov. 23, 2021, 3 pages.

* cited by examiner

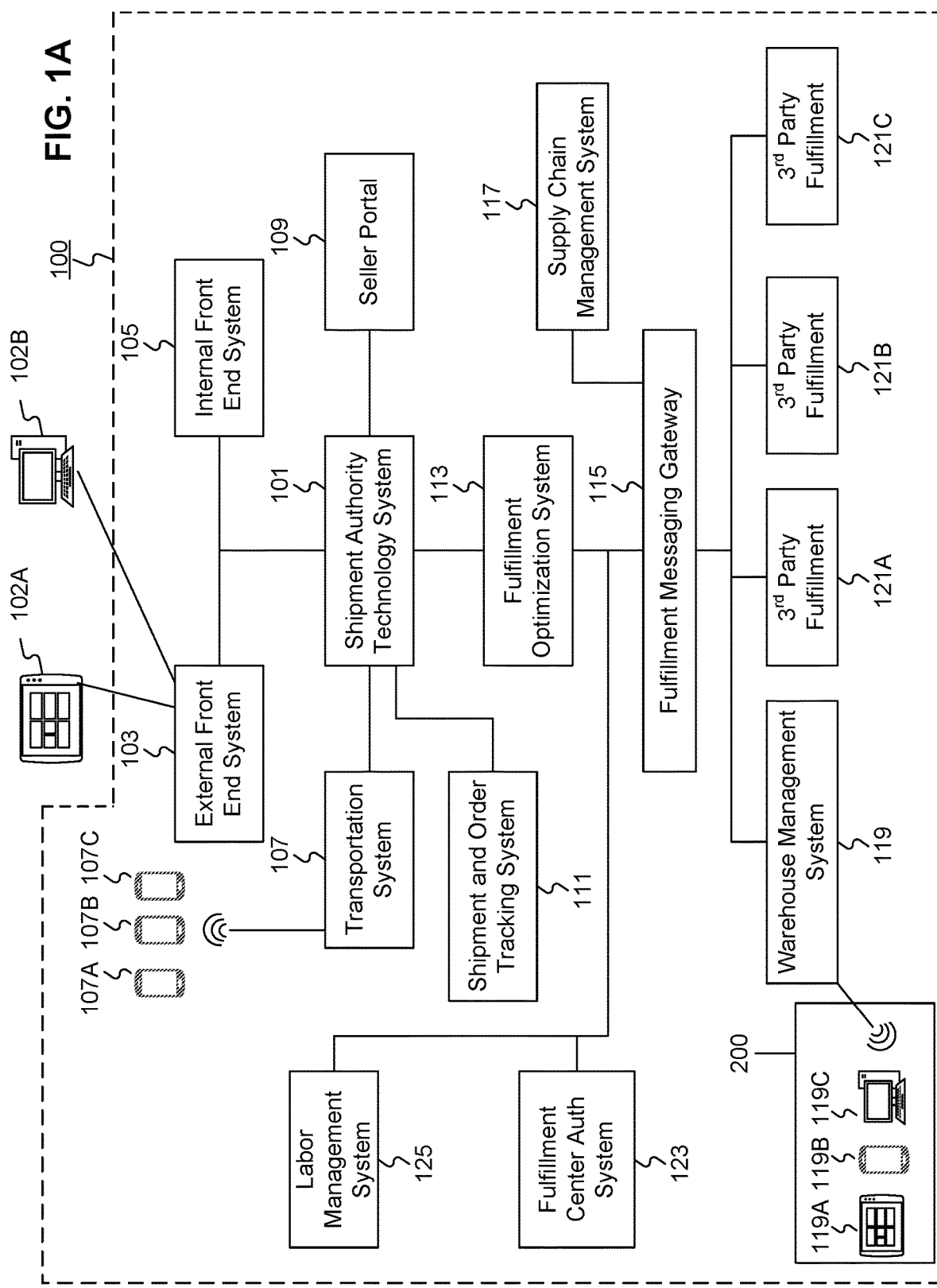

SYSTEMS AND METHODS FOR MANAGING A HIGHLY AVAILABLE DISTRIBUTED HYBRID TRANSACTIONAL AND ANALYTICAL DATABASE

CROSS-REFERENCE TO RELATED APPLICATIONS

This application is a continuation of U.S. patent application Ser. No. 17/105,040, filed Nov. 25, 2020, currently pending and allowed, the disclosure of which is expressly incorporated herein by reference in its entirety.

TECHNICAL FIELD

The present disclosure generally relates to computerized methods and systems for building and maintaining a highly available distributed hybrid transactional and analytical database. In particular, embodiments of the present disclosure relate to inventive and unconventional systems that maximize uptime, minimize failover time and maintain a hybrid transactional and analytical database by employing a proxy which can translate analytical protocol and SQL incompatibility into transactional protocol and dialect and intelligently dispatch queries to transactional or analytical databases based on predicting data size the query will retrieve.

BACKGROUND

Databases can usually be divided into two types: transactional and analytical. Transactional databases, also known as on-line transaction processing (OLTP) databases, such as MySQL, are generally used for transactions and queries which only involve a small data set. Analytical databases, also known as on-line analytical processing (OLAP) databases, on the other hand, can be used for multiple dimension analysis on large data sets. Traditionally, OLTP and OLAP databases were always separated systems which had to be synched up periodically. However, this meant that these systems were not fit for real-time analysis.

More recently, attempts have been made at perfecting real-time synching of OLTP to OLAP databases by database replication mechanisms, essentially cutting back on the time it would take to perform the synching. However, these systems are still flawed as they still use two separated database systems which require intermediary software to communicate. This leads to issues such as having to communicate with different code due to the difference in protocol, the systems not knowing which database should handle which queries, and an inability to have a centralized failover or switchover mechanism.

Therefore, there is a need for systems and methods for managing a highly available distributed hybrid transactional and analytical database which reduce failover time to seconds, provide a standalone solution which can function without intermediary software, knows which database cluster should handle which queries, and has a centralized failover and switchover mechanism. Such systems and methods would minimize failover time, lower the failure rate, achieve greater uptime as a whole, be cost-effective and uncomplicated for businesses and their programmers.

SUMMARY

One aspect of the present disclosure is directed to a computer-implemented system for managing a highly available distributed hybrid database. The system may comprise a memory storing instructions; and one or more processors configured to execute the instructions to: receive a query from a user device to retrieve data from a distributed database comprising a source node, a first plurality of replica nodes, and a second plurality of replica nodes, wherein the source node and the first plurality of replica nodes form a transactional cluster, and wherein the second plurality of replica nodes forms an analytical cluster; determine whether to process the query using the transactional cluster or the analytical cluster based on one or more rules; translate the query into a first protocol that the determined cluster comprehends; select a replica node corresponding to the determined cluster; process the query using the selected replica node; and send data associated with results from processing the query to the user device.

Yet another aspect of the present disclosure is directed to a computer-implemented method for managing a highly available distributed hybrid database. The method may comprise: receiving a query from a user device to retrieve data from a distributed database comprising a source node, a first plurality of replica nodes, and a second plurality of replica nodes, wherein the source node and the first plurality of replica nodes form a transactional cluster, and wherein the second plurality of replica nodes forms an analytical cluster; determining whether to process the query using the transactional cluster or the analytical cluster based on one or more rules; translating the query into a first protocol that the determined cluster comprehends; selecting a replica node corresponding to the determined cluster; processing the query using the selected replica node; and sending data associated with results from processing the query to the user device.

Still further, another aspect of the present disclosure is directed to a computer-implemented system for managing a highly available distributed hybrid database. The system may comprise: a memory storing instructions; and one or more processors configured to execute the instructions to: receive a query from a user device to retrieve data from a distributed database comprising a source node, a first plurality of replica nodes, and a second plurality of replica nodes, wherein the source node and the first plurality of replica nodes form an online transaction processing (OLTP) cluster, and wherein the second plurality of replica nodes forms an online analytical processing (OLAP) cluster; determine which replica nodes of the first plurality of replica nodes and the second plurality of replica nodes are available; create a healthy replica node list based on the availability of each replica node; determine whether to process the query using the OLTP cluster or the OLAP cluster based on one or more rules; translate the query into a first protocol that the determined cluster comprehends; select a replica node based on the healthy replica node list corresponding to the determined cluster; process the query using the selected replica node; and send data associated with results from processing the query to the user device.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized methods and systems that manage a highly available and scalable distributed database, where constant uptime and minimal error rate are desired.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
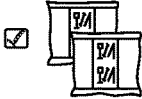
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
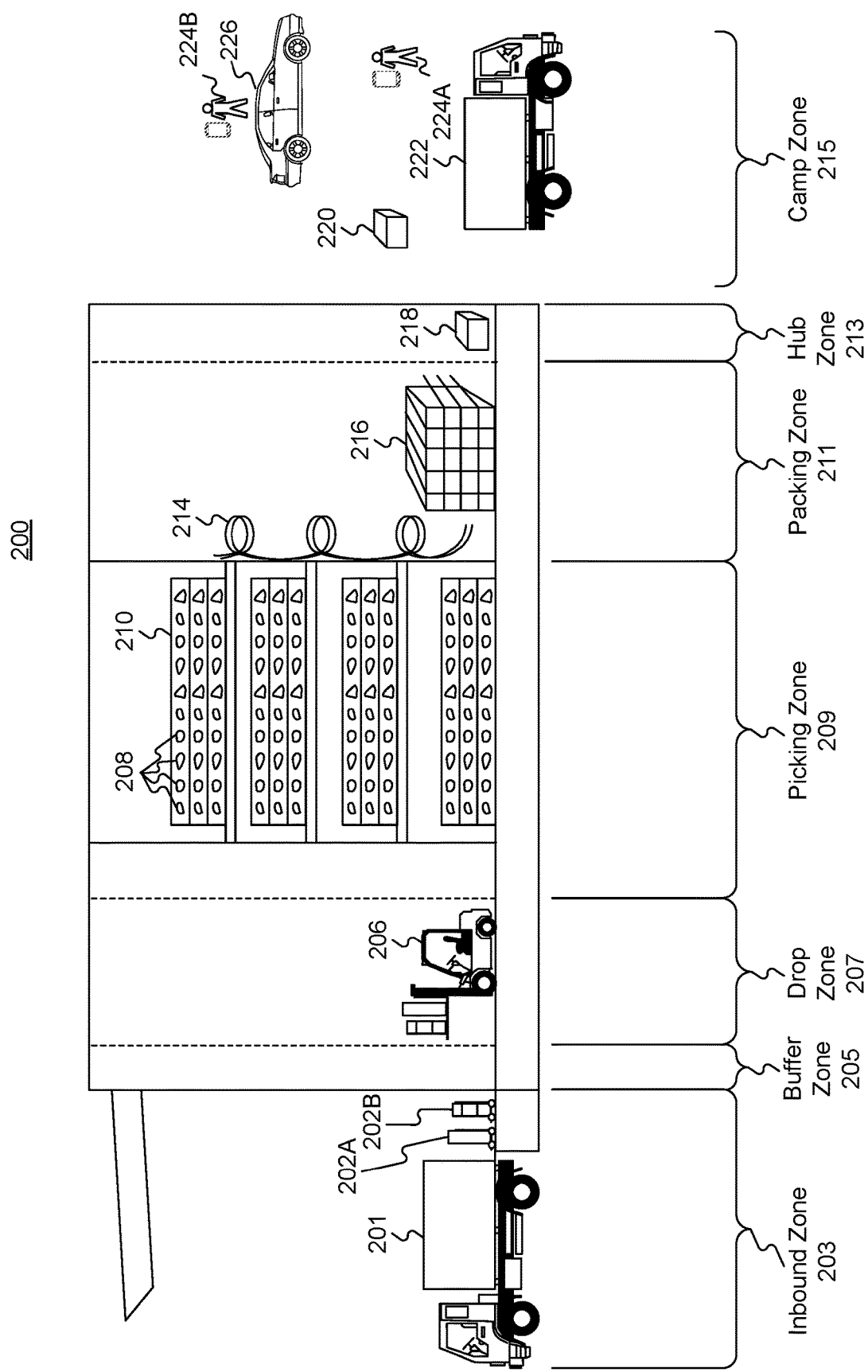
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
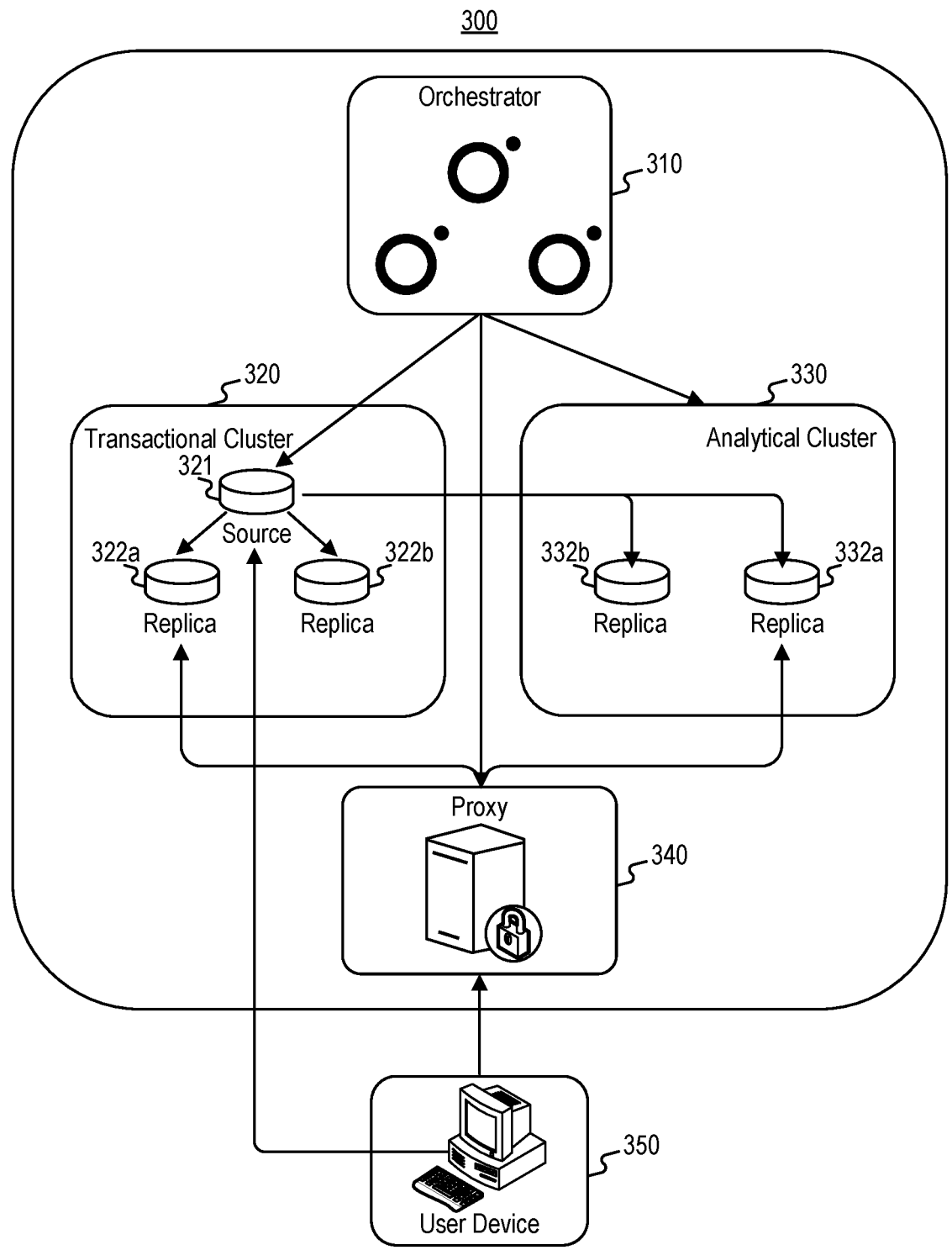
FIG. 3 is a schematic block diagram illustrating an exemplary embodiment of a network comprising a distributed hybrid database and a system for managing the distributed hybrid database, consistent with the disclosed embodiments.

FIG. 3 is a schematic block diagram illustrating an exemplary embodiment of a network 300 comprising a distributed hybrid database and a system for managing the distributed hybrid database. Network 300 may comprise a variety of computerized systems, each of which may be connected to each other via one or more networks. In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like. The individual systems may also be located within one geographical location or be geographically dispersed.

In some embodiments, the depicted systems may include an orchestrator 310, a distributed transactional cluster 320 including a source node 321 and a plurality of transactional replica nodes 322 (depicted are two transactional replica nodes 322a and 322b), a distributed analytical cluster 330 including a plurality of analytical replica nodes 332 (depicted are two analytical replica nodes 332a and 332b), a proxy 340, and a user device 350.

While only two transactional replica nodes 322a and 322b, and two analytical replica nodes 332a and 332b are depicted in FIG. 3, the number is only exemplary and fewer or additional replica nodes may be implemented. Also, distributed transactional cluster 320 and distributed analytical cluster 330 may be referred to as distributed databases 320 and 330, respectively.

Each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Orchestrator 310, in some embodiments, may be any computerized system configured to manage the topology of distributed databases 320 and 330. For example, orchestrator 310 may determine that source node 321 is not available. Upon this determination, orchestrator 310 may trigger a failover method which may replace the failed source node 321 with a healthy transactional replica node 322 and ensure the connections are updated appropriately. Orchestrator 310 may be a relational database management system (RDBMS) such as, but not limited to, Oracle Database, MySQL, Microsoft SQL Server, and IBM DB2. In some embodiments, orchestrator 310 may be distributed such that should one server endpoint of orchestrator 310 fail, one or more endpoints remain to continue managing database cluster 330.

Distributed transactional cluster 320, in some embodiments, may be any computerized system configured to collect, organize, and store various data. Transactional cluster 320 may be a relational database where data stored therein is organized in one or more data sets. Transactional cluster 320 may include data such as that stored in or accessed by SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125.

Transactional cluster 320 may include a source node 321 and one or more transactional replica nodes 322a and 322b. Source node 321 may be configured to process write requests sent by user device 350, while transactional replica nodes 322a and 322b may be configured to process read requests sent by user device 350 and processed by proxy 340. Contrary to conventional nodes that are configured to both accept new data for storage and make the data available for client devices (e.g., user device 350), source node 321 may be configured solely to collect and maintain the latest data set by accepting new data from user device 350. Each transactional replica node 322a/322b may be further configured to store data identical to those stored in source node 321. For example, if source node 321 includes data sets 1-10 (i.e., a master set), each transactional replica node 322 may be configured to replicate and store data sets 1-10. Compared to conventional databases, separating the read and write functionalities into dedicated nodes allows each functionality to take place without being intermingled with the other, thus lowering the risk of write or read errors. Each transactional replica node 322 has the ability to be promoted to a source node should source node 321 fail and orchestrator 310 trigger a failover.

Distributed analytical cluster 330, in some embodiments, may be any computerized system configured to collect, organize, and store various data. Analytical cluster 330 may be a relational database where data stored therein is organized in one or more data sets. Analytical cluster 320 may include data such as that stored in or accessed by SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125.

Analytical cluster 330 may include one or more analytical replica nodes 332 (e.g., analytical replica nodes 332a and 332b). Analytical replica nodes 332 may be configured to process read requests and to store data identical to those stored in source node 321. As discussed above, separating the read and write functionalities into dedicated nodes lowers the risk of write or read errors.

Proxy 340, in some embodiments, may be any computerized system configured to translate protocol from transactional protocol and dialect to analytical protocol and dialect and vice versa, to dispatch queries to either transactional cluster 320 or analytical cluster 330 based on one or more rules, and/or to maintain a healthy replica list to avoid requests to failed endpoints. For example, proxy 340 may receive a query from user device 350 in SQL (i.e., transactional protocol and dialect). Proxy 340 may then determine whether transactional cluster 320 or analytical cluster 330 is better equipped to handle the query based on a prediction of the data size the query will retrieve and one or more rules, the one or more rules including, for example, a data size threshold, historical performance, and/or database statistics. Proxy 340 may then send the query directly to a transactional replica node 322 or to an analytical replica node 332 after translating the query into analytical protocol and dialect. The results from processing the query may then be sent back to the user device 350 through proxy 340, which translates the results into protocol and dialect user device 350 comprehends when needed. In some embodiments, proxy 340 selects a replica node based on a healthy replica list, which is a list of available replica nodes which proxy 340 may manage by monitoring the availability of the replica nodes in each distributed databases 320 and 330.

User device 350, in some embodiments, may be any computerized system configured to allow a user to read and/or write data in distributed databases 320 and 330. User device 350 may be one or more of mobile device 102A, computer 102B, mobile devices 107A, 107B, and 107C, external front end system 103, internal front end system 105, mobile devices 119A, 1198, and 119C, or any other system depicted in FIG. 1A. In some embodiments, user device 350 may be configured to send read queries through proxy 340 and write queries directly to source node 321. In other embodiments, user device 350 may be configured to receive notifications from proxy 340 to automatically update the source endpoint based on the notification should source node 321 fail, and replace the connection using the updated endpoint. In other embodiments, the update of the source endpoint may take place only following user input. User device 350 may be a personal computing device including, but not limited to, a smartphone, a laptop or notebook computer, a tablet, a multifunctional watch, a pair of multifunctional glasses, any mobile or wearable device with computing ability, or any combination of these computers and/or affiliated components.

In some embodiments, user device 350 may be connected directly to source node 321. The connection may be utilized to send and process write queries. Once source node 321 has been updated following a received write query, each transactional replica node 322 and analytical replica node 332 may be configured to replicate and store the updated data from source node 321.

Figure 4:
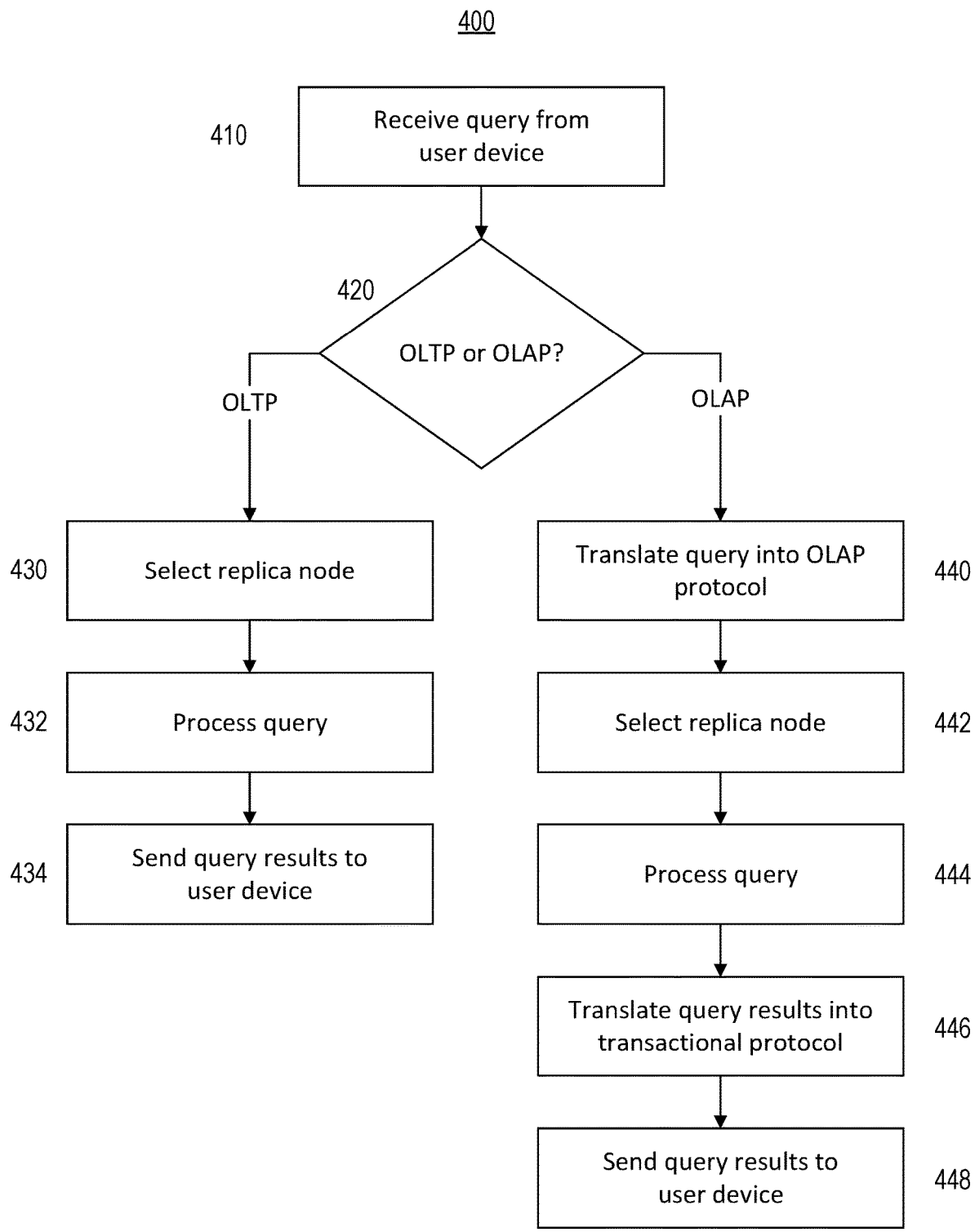
FIG. 4 is a flowchart of an exemplary computerized method for determining which of a transactional cluster or an analytical cluster is better equipped to process a query, consistent with the disclosed embodiments.

FIG. 4 is a flowchart of an exemplary computerized method 400 for determining which of a transactional cluster and an analytical cluster is better equipped to process a query. Method 400 may be implemented utilizing data stored in any server that must service a large number of queries such as, for example, SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125. Such server may comprise networked systems such as those described above in FIG. 3. Method 400 is described below with reference to the networked systems of FIG. 3, but any other configuration of systems, subsystems, or modules may be used to perform method 400.

At step 410, proxy 340 may receive a read query from user device 350. This read query may be in transactional protocol and dialect such as SQL. At step 420, proxy 340 may determine whether to process the query using transactional (OLTP) cluster 320 or analytical (OLAP) cluster 330 based on a prediction of the data size the read query will retrieve and one or more rules. In some embodiments, the data size the read query will retrieve may refer to how much data the read query will need to scan to determine which data to return to the user. Predicting the data size the read query will retrieve may be achieved by utilizing one or more of statistics methods such as estimating ANALYZE TABLE complexity for InnoDB Tables in MySQL, costing methods, a cost-based optimizer (CBO), internal rules, and/or a rule-based optimizer (RBO), to determine the most efficient way of producing the result of the query. The one or more rules may include, but are not limited to, a threshold, historical performance, and/or database statistics.

If proxy 340 determines that transactional cluster 320 is better equipped to process the read query, method 400 may proceed to step 430. At step 430, proxy 340 may select a transactional replica node 322 based on a healthy replica list stored by proxy 340. For example, if transactional replica node 322a is listed in the healthy replica list as "not available," and transactional replica node 322b is listed as "available," proxy 340 will select transactional replica node 322b. Once transactional replica node 322b is selected, at step 432 proxy 340 may process the read query using transactional replica node 322b.

At step 434, proxy 340 may receive results from the selected transactional node (e.g., replica nodes 322a/322b), and send the results of the read query to user device 350.

If, however, proxy 340 determines that analytical cluster 320 is better equipped to process the read query, method 400 may proceed to step 440. At step 440, proxy 340 may translate the read query into OLAP protocol and dialect, such as Multidimensional Expressions (MDX), so the analytical replica node 332 may comprehend the query. The translation may be performed, for example, by utilizing a protocol-aware proxy server for MySQL and its forks, such as ProxySQL, to rewrite a transactional query into an analytical query. For example, such a proxy server may use one of the following methods including, but not limited to, aggregating, joining data, cleaning data, extracting data, sorting, filtering, generating calculated data based on existing values, validating data, converting data into an appropriate format, merging data, and other methods for translating OLTP protocol and dialect into OLAP protocol and dialect.

At step 442, proxy 340 may select an analytical replica node 332 based on the healthy replica list. For example, if analytical replica node 332b is listed in the healthy replica list as "not available," and analytical replica node 332a is listed as "available," proxy 340 will select analytical replica node 332a. Once analytical replica node 332a is selected, at step 444, proxy 340 may process the read query using analytical replica node 332a.

At step 446, proxy 340 may translate the query results back into OLTP protocol and dialect which user device 350 may comprehend (e.g., MySQL), and at step 448, proxy 340 may send the translated results of the read query to user 350.

Figure 5:
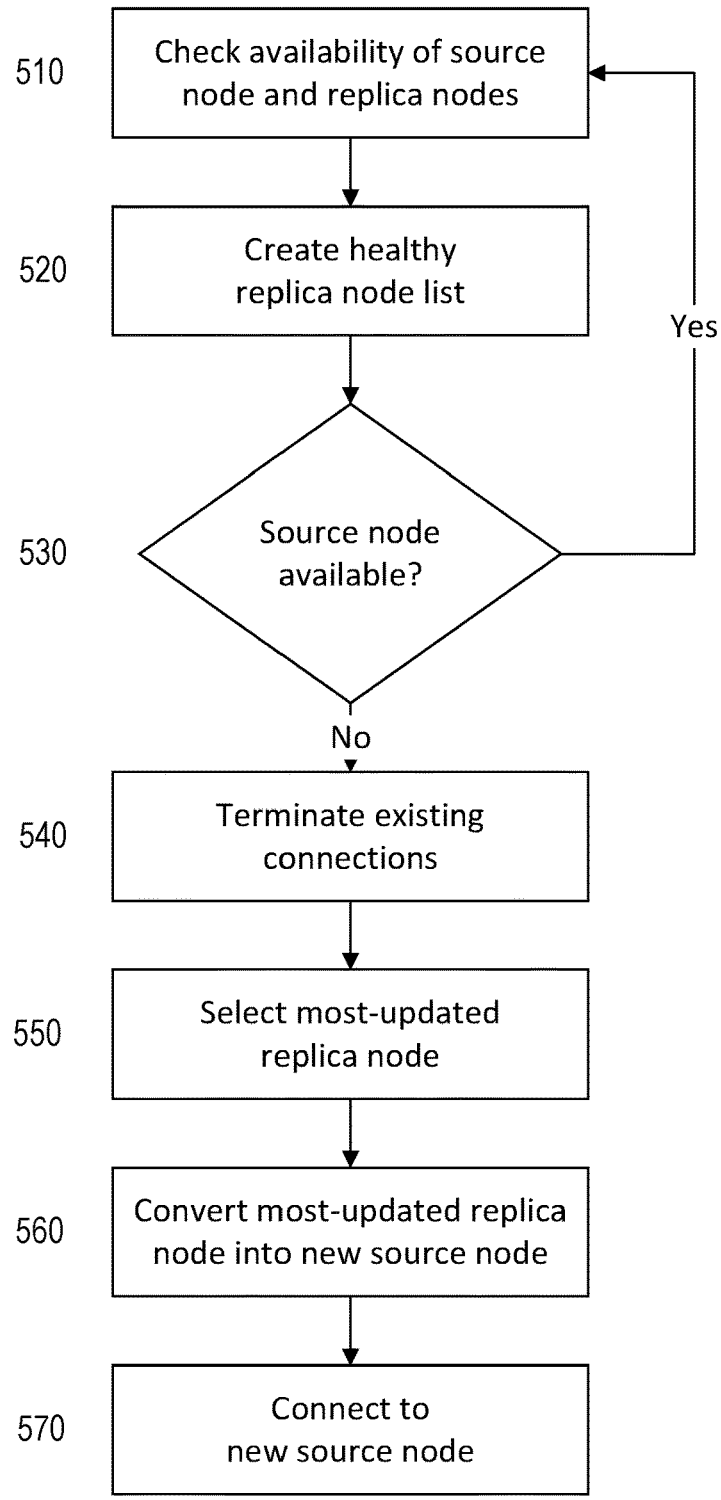
FIG. 5 is a flowchart of an exemplary computerized method for replacing a source node with a replica node following a failure of the source node, consistent with the disclosed embodiments.

FIG. 5 is a flowchart of an exemplary computerized method 500 for replacing source node 321 with a transactional replica node 322 following a failure of source node 321. Method 500 may be implemented utilizing data stored in any server that must service a large number of queries such as, for example, SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125. Such server may comprise networked systems such as those described above in FIG. 3. Method 500 is described below with reference to the networked systems of FIG. 3, but any other configuration of systems, subsystems, or modules may be used to perform method 500.

At step 510, orchestrator 310 and/or proxy 340 may check the availability of source node 321 and/or one or more replica nodes, including transactional replica nodes 322a and 322b and analytical replica nodes 332a and 332b. Checking the availability of source node 321 and/or one or more replica nodes may be accomplished by a detecting a number of failure scenarios, such as a failed source node, a failed source node and failed replica nodes, a failed source node and some failed replica nodes, an unreachable source node, an unreachable source node with lagging replica nodes, not all replica nodes are replicating the source node data, not all replica nodes are replicating the source node data or have failed, a failed co-source node (should the system have more than one source node), a failed co-source node and failed replica nodes, a failed replica node which itself has replicas, a failed replica node which itself has one replica which is failing to connect, a failed replica node which itself has one replica, a failed replica node which itself has one or more replicas which have failed, a failed replica node which itself has one or more replicas—some of which have failed, all replica nodes which themselves have one or more replicas have failed or are unable to connect, an unreachable replica node which itself has one or more replicas is unreachable, an unreachable replica node which itself has one or more replicas which are lagging is unreachable.

The failure scenarios may be detected by attempting to reach and/or access source node 321 and/or one or more replica nodes, determining one or more replica nodes is failing replication, determining source node 321 and/or one or more replica nodes are lagging, and other methods for detecting failure scenarios.

In other embodiments, orchestrator 310 and/or proxy 340 may use synthetic monitoring to simulate an action or path that a user using user device 350 may take on each node in transactional cluster 320 and analytical cluster 330 to check the availability of source node 321 and/or one or more replica nodes. The actions or paths may then be continuously monitored at predetermined intervals to test the availability of each node. Should the actions or paths be completed successfully, orchestrator 310 and/or proxy 340 may determine that the node is available. Further, depending on the scale and the desired availability of the system, the predetermined intervals could range anywhere from milliseconds to hours. Other methods for checking the availability of the nodes include attempting to open a connection to the nodes, executing a read query against the nodes, executing a non-cached write query against the nodes, executing a prewritten function or procedure that checks for the availability of the nodes, and/or any other method for checking the availability of a database.

At step 520, proxy 340 may create a healthy replica list based on which replica nodes are available. The healthy replica list may be used in method 400 to determine which replica node to send the read query to.

At step 530, orchestrator 310 may determine whether source node 321 is available. Should source node 321 be available, orchestrator 310 may wait for a specific interval of time before checking the availability of source node 321 once again as method 500 returns to step 510.

However, if source node 321 is not available, method 500 may proceed to step 540, where orchestrator 310 may terminate any existing connections source node 321 may have with replica nodes 322a, 322b, 332a, and 332b, and user device 350. Orchestrator 310 may terminate the connections by, for example, forcing source node 321 offline, creating a dynamic KILL statement for each connection, and/or altering source node 321 to having a single or restricted user.

At step 550, orchestrator 310 may select a most-updated transactional replica node from the one or more transactional replica nodes 322. The most-updated transactional replica node may be, as its name would suggest, the last transactional replica node 322a or 322b to have been updated with the data from source node 321 before it failed. Orchestrator 310 may store an instance or list identifying the most-updated replica node and/or may pull data relating to the most-updated replica node from SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125, or any other system. For the purpose of this illustration, we may assume that the most-updated transactional replica node in this case was 322a.

At step 560, orchestrator 310 may switch the role of transactional replica node 322a from "replica" to "source," also known as source or master promotion, converting transactional replica node 322a into promoted source node 322a. This may take place by executing one or more "set" commands in SQL or a similar function in whichever language is being utilized. For example, orchestrator 310 may use a "set" command to set replica node 322a as "writable." Additionally or alternatively, orchestrator 310 may remove the role of source node 321 by using a "set" command to set source node 321 to be "read-only" or "super-read-only," converting source node 321 into demoted source node 321.

At step 570, orchestrator 310 may establish new connections to promoted source node 322a. The reestablished connections may include new connections from user device 350, transactional replica node 322b, and analytical replica nodes 332a and 332b to promoted source node 322a. For example, orchestrator 310 may connect transactional replica node 322b, analytical replica nodes 332a and 332b to promoted source node 322a to replicate the data found in promoted source node 322a. Additionally or alternatively, orchestrator 310 may update its domain name system (DNS) to let user device 350 know that the Internet protocol (IP) of the source node has changed.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing a distributed hybrid database, the system comprising:
a memory storing instructions; and
one or more processors configured to execute the instructions to:
receive a query;
determine whether to process the query using a transactional cluster or an analytical cluster based on one or more rules;
if the determined cluster is the analytical cluster, translate the query into a first protocol that the analytical cluster comprehends;
if the determined cluster is the transactional cluster, determine a source node availability, wherein, in response to determining that the source node is not available:
terminate existing connections to the source node;
select a most-updated replica node from one or more of replica nodes associated with the transactional cluster;
convert the most-updated replica node into a promoted source node; and
connect a user device, the one or more of replica nodes associated with the transactional cluster, and one or more replica nodes associated with the analytical cluster to the promoted source node;
select an available replica node corresponding to the determined cluster;
process the query using the selected replica node; and
transmit data associated with results from processing the query.

2. The system of claim 1, wherein the processor is further configured to create a healthy replica node list based on availability of one or more replica nodes of at least one of the transactional cluster or the analytical cluster.

3. The system of claim 2, wherein the selected replica node is selected based on the healthy replica node list.

4. The system of claim 1, wherein the determining whether to process the query using the transactional cluster or the analytical cluster further comprises:
predicting a data size the query will retrieve by using at least one of statistics methods, costing methods, a cost-based optimizer (CBO), internal rules, or a rule-based optimizer (RBO), to determine the most efficient way of producing the results of the query; and
wherein the one or more rules comprise at least one of a threshold, historical performance, or database statistics.

5. The system of claim 1, wherein the transmitting data associated with the results from the processing the query further comprises:
determining a user device does not comprehend the first protocol; and
translating the results into a second protocol which the user device comprehends.

6. The system of claim 1, wherein the processor is further configured to:
receive a write query from a user device;
update the promoted source node based on the write query; and
update one or more replica nodes based on the updated promoted source node.

7. The system of claim 1, wherein the distributed hybrid database comprises the promoted source node, a first plurality of replica nodes, and a second plurality of replica nodes, wherein the promoted source node and the first plurality of replica nodes form the transactional cluster, and wherein the second plurality of replica nodes forms the analytical cluster.

8. The system of claim 7, wherein the promoted source node is configured to process write queries and one or more replica nodes of the first plurality of replica nodes and the second plurality of replica nodes are configured to process read queries.

9. The system of claim 1, wherein the transactional cluster is an online transaction processing (OLTP) database, and wherein the analytical cluster is an online analytical processing (OLAP) database.

10. A computer-implemented method for managing a distributed hybrid database, the method comprising:
receiving a query;
determining whether to process the query using a transactional cluster or an analytical cluster based on one or more rules;
if the determined cluster is the analytical cluster, translating the query into a first protocol that the analytical cluster comprehends;
if the determined cluster is the transactional cluster, determining a source node availability, wherein, in response to determining that the source node is not available:
terminating existing connections to the source node;
selecting a most-updated replica node from one or more of replica nodes associated with the transactional cluster;
converting the most-updated replica node into a promoted source node; and
connecting a user device, the one or more of replica nodes associated with the transactional cluster, and one or more replica nodes associated with the analytical cluster to the promoted source node;
selecting an available replica node corresponding to the determined cluster;
processing the query using the selected replica node; and
transmitting data associated with results from processing the query.

11. The method of claim 10, further comprising creating a healthy replica node list based on availability of one or more replica nodes of at least one of the transactional cluster or the analytical cluster.

12. The method of claim 11, wherein the selected replica node is selected based on the healthy replica node list.

13. The method of claim 10, wherein the determining whether to process the query using the transactional cluster or the analytical cluster further comprises:
predicting a data size the query will retrieve by using at least one of statistics methods, costing methods, a cost-based optimizer (CBO), internal rules, or a rule-based optimizer (RBO), to determine the most efficient way of producing the results of the query; and
wherein the one or more rules comprise at least one of a threshold, historical performance, or database statistics.

14. The method of claim 10, wherein the transmitting data associated with the results from the processing the query further comprises:
determining a user device does not comprehend the first protocol; and
translating the results into a second protocol which the user device comprehends.

15. The method of claim 10, further comprising:
receiving a write query from a user device;
updating the promoted source node based on the write query; and updating one or more replica nodes based on the updated promoted source node.

16. The method of claim 10, wherein the distributed hybrid database comprises the promoted source node, a first plurality of replica nodes, and a second plurality of replica nodes, wherein the promoted source node and the first plurality of replica nodes form the transactional cluster, and wherein the second plurality of replica nodes forms the analytical cluster.

17. The method of claim 16, wherein the promoted source node is configured to process write queries and one or more replica nodes of the first plurality of replica nodes and the second plurality of replica nodes are configured to process read queries.

18. The method of claim 10, wherein the transactional cluster is an online transaction processing (OLTP) database, and wherein the analytical cluster is an online analytical processing (OLAP) database.

* * * * *